(12) United States Patent
Van Het Hul et al.

(10) Patent No.: US 11,167,577 B2
(45) Date of Patent: Nov. 9, 2021

(54) SYSTEM AND METHOD FOR MARKING BATCHES

(71) Applicant: VMI HOLLAND B.V., Epe (NL)

(72) Inventors: William Van Het Hul, Epe (NL); Erwin Bertram Welink, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/616,828

(22) PCT Filed: May 18, 2018

(86) PCT No.: PCT/NL2018/050335
§ 371 (c)(1),
(2) Date: Nov. 25, 2019

(87) PCT Pub. No.: WO2018/217082
PCT Pub. Date: Nov. 29, 2018

(65) Prior Publication Data
US 2020/0094600 A1    Mar. 26, 2020

(30) Foreign Application Priority Data

May 24, 2017   (NL) .................................... 2018973

(51) Int. Cl.
*B41K 3/08* (2006.01)
*B29C 48/08* (2019.01)
(Continued)

(52) U.S. Cl.
CPC ............ *B41K 3/08* (2013.01); *B29C 48/0023* (2019.02); *B29C 48/08* (2019.02);
(Continued)

(58) Field of Classification Search
CPC ....................................................... B41K 3/08
(Continued)

(56) References Cited

U.S. PATENT DOCUMENTS 3,148,103 A     9/1964  Gallagher ..................... 156/224
4,027,586 A *   6/1977  Hubbard ................ G06K 1/121
                                                    101/93.01
(Continued)

FOREIGN PATENT DOCUMENTS

CN    103434284     12/2013    ............. B41K 3/00
CN    103545223      1/2014    ............. H01L 21/67
(Continued)

OTHER PUBLICATIONS

Decision to Grant issued in related Japanese Patent Application Serial No. 2019-515833, dated Sep. 29, 2020 with English Translation (5 pages).
(Continued)

*Primary Examiner* — Anthony H Nguyen
(74) *Attorney, Agent, or Firm* — Hayes Soloway P.C.

(57) ABSTRACT

Disclosed is a system and a method for marking a continuously produced sheet of elastomeric material to identify sheet batches associated with a respective stock of raw extrusion material in a longitudinal direction of the continuously produced sheet. The apparatus includes one or more marking tools for providing the continuously produced sheet with a series of batch markings which are indicative of the respective sheet batch and for providing a start or end marking indicating the start or end, respectively, of a respective sheet batch.

13 Claims, 11 Drawing Sheets

(51) Int. Cl.
  *B29C 48/25* (2019.01)
  *B29C 48/00* (2019.01)
  *B41K 3/10* (2006.01)
  *B41K 3/12* (2006.01)
  *B41K 3/14* (2006.01)
  *B29C 37/00* (2006.01)

(52) U.S. Cl.
  CPC .......... *B29C 48/2692* (2019.02); *B41K 3/105* (2013.01); *B41K 3/123* (2013.01); *B41K 3/127* (2013.01); *B41K 3/14* (2013.01); *B29C 2037/80* (2013.01)

(58) Field of Classification Search
  USPC .................................................. 101/93, 93.01
  See application file for complete search history.

(56) References Cited

U.S. PATENT DOCUMENTS

| | | | |
|---|---|---|---|
| 5,137,661 A | 8/1992 | Kanome et al. | 264/1.3 |
| 5,337,668 A * | 8/1994 | Matsuoka | G03F 9/00 101/481 |
| 9,847,300 B2 | 12/2017 | Sakai et al. | H01L 23/544 |
| 2004/0134983 A1* | 7/2004 | Oyama | B29D 30/0061 235/385 |
| 2007/0289956 A1* | 12/2007 | Knysh | G05B 19/41815 219/121.68 |
| 2015/0027083 A1* | 1/2015 | Polloni | B65B 19/228 53/131.4 |
| 2015/0286900 A1* | 10/2015 | Barros | G06K 7/1447 358/3.28 |
| 2016/0055772 A1* | 2/2016 | Powell | B42D 15/00 283/71 |
| 2018/0345619 A1* | 12/2018 | Lang | B65H 21/00 |

FOREIGN PATENT DOCUMENTS

| | | | |
|---|---|---|---|
| DE | 1258425 | 1/1968 | ............ B41K 1/12 |
| DE | 68925517 | 6/1996 | ............ B29C 43/22 |
| EP | 2657022 | 10/2013 | ............ B41F 1/56 |
| GB | 884906 | 12/1961 | |
| GB | 912593 | 12/1962 | |
| JP | H07276768 | 10/1995 | ............ B41F 17/10 |
| JP | 2002-36692 | 2/2002 | ............ B41K 3/14 |
| JP | 2002036692 | 2/2002 | ............ B41K 3/14 |
| JP | 2004-216999 | 8/2004 | ............ B60C 13/00 |
| JP | 2010-96511 | 4/2010 | ............ G01N 1/04 |
| JP | 5131555 | 11/2012 | ............ G01N 1/04 |
| JP | 5131555 | 1/2013 | ............ G01N 1/04 |
| WO | WO2016166726 | 10/2016 | ............ B29C 47/00 |

OTHER PUBLICATIONS

International Search Report and Written Opinion issued in application No. PC11NL2018/050335, dated Aug. 23, 2018 (14 pgs).

Official Action issued in related Japanese Patent Application Serial No. 2019-515833, dated Jun. 18, 2020 with English Translation (6 pages).

Official Action issued in related Chinese Patent Application Serial No. 201880033838.7, dated Apr. 6, 2021 with English Translation (15 pages).

* cited by examiner

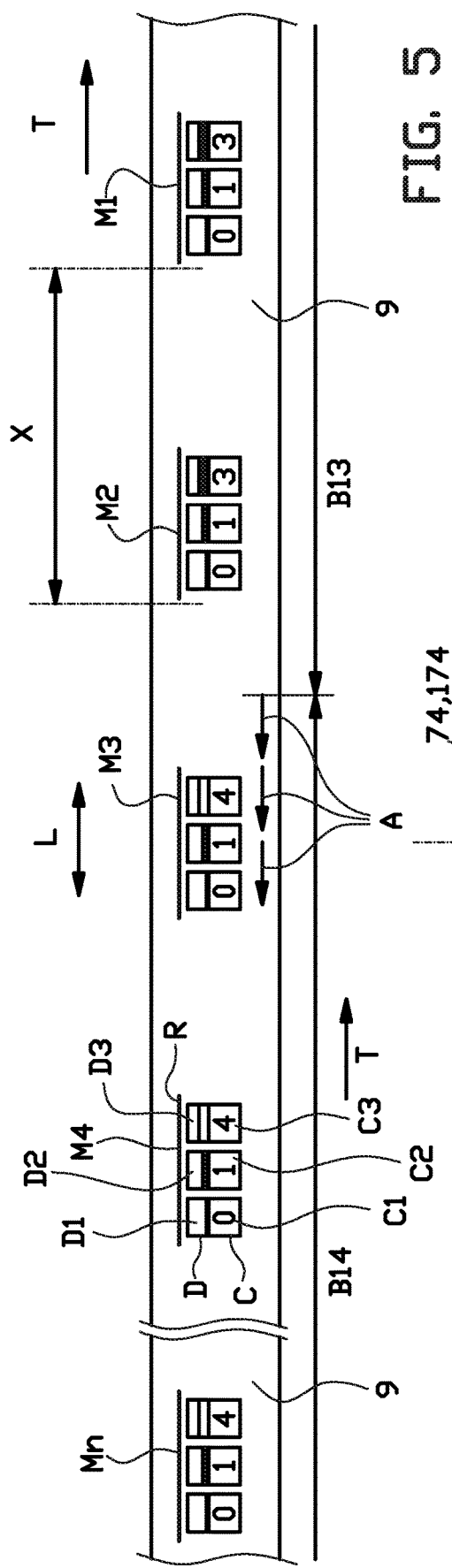
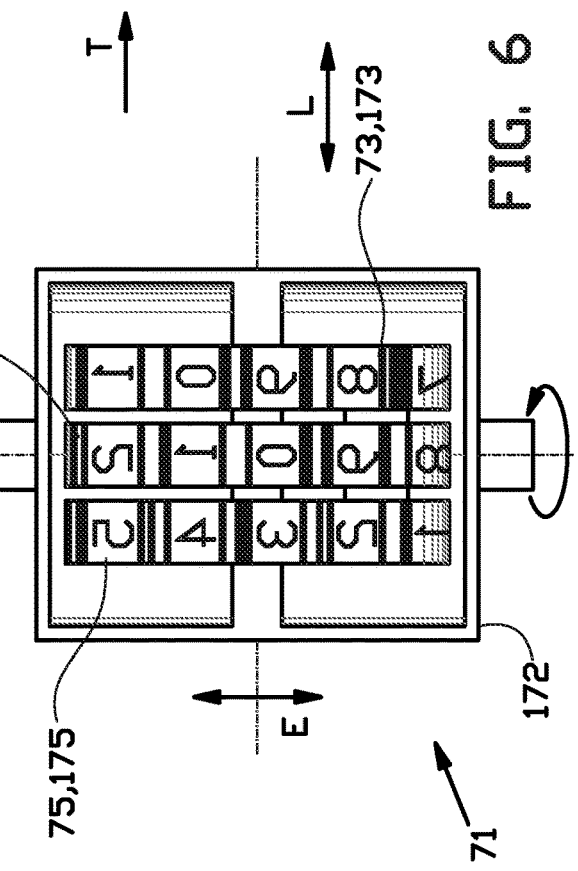

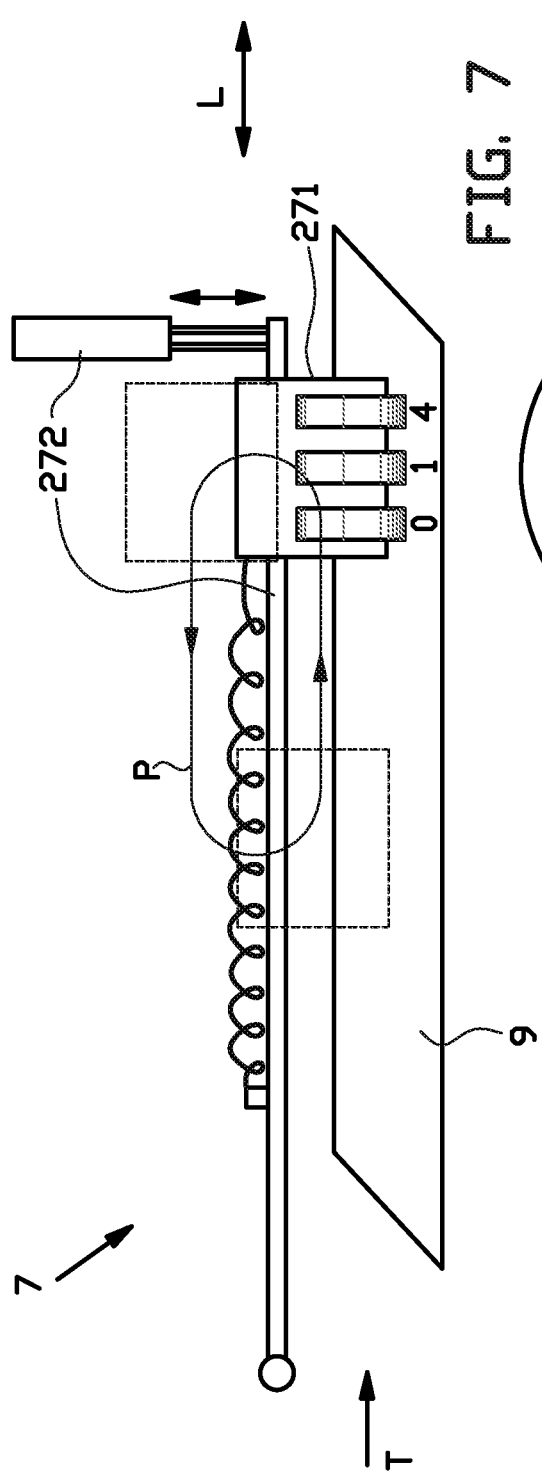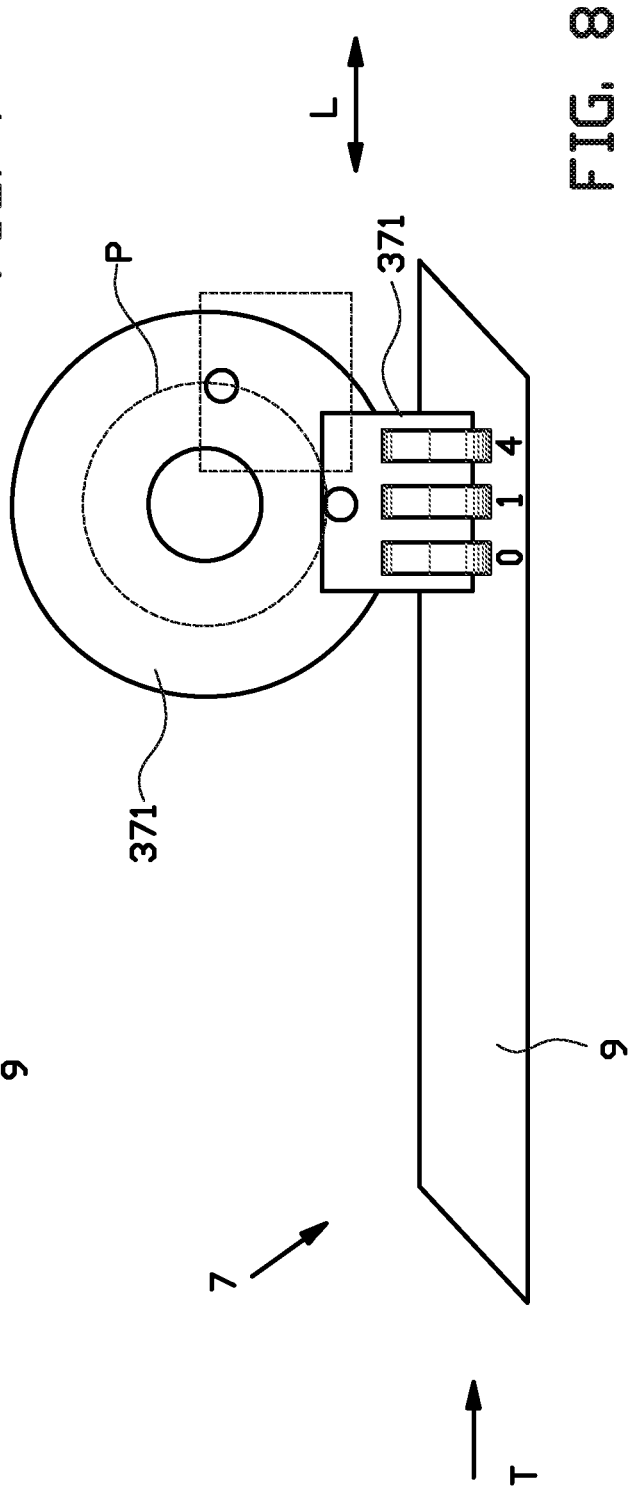

SYSTEM AND METHOD FOR MARKING BATCHES

BACKGROUND

The invention relates to an apparatus for marking batches and a system and method for marking batches and/or processing said marked batches.

In tire manufacturing, one or more ingredients are mixed into a specific rubber compound which is then formed into a rubber sheet. The rubber sheet is subsequently coated, cooled and stored to be used in the production of various tire components. Each tire component requires one or more specific rubber compounds. In modern batch supply, the batches are continuous, meaning that the switch-over from one batch to another batch occurs in a continuously conveyed, seamless rubber sheet and thus is very hard to identify. However, for the uniformity of the tire components, it is important that individual batches can be reliably identified and sampled.

JP 5131555 B2 discloses a method and device for sampling a sheet-like rubber. The device comprises an identification mark applying machine with a rotary member having irregularities on the outer circumferential surface. When changing to a new lot, the operator controls the identification mark applying machine to lower the rotary member onto the sheet-like rubber, thereby applying an identification mark corresponding to the irregularities to the final batch of the previous lot. A sampling device is provided for punching out samples from each batch. The sample pieces before and after the replacement of each lot can easily be discriminated by determining the presence of the identification mark in the sample pieces.

The known identification mark applying machine helps in identifying the samples, but may not be reliable in identifying the batches themselves. In particular, the batches within a lot are not marked. Occasionally, an operator is forced to remove one or more non-uniform batches. When one of those batches contains the discrimination mark, it will not be possible to visually determine the location of a batch in a stack of batches or to distinguish between lots. In addition, the batches may be stretched or contracted during handling. Hence, determining the batches based on encoder pulses can potentially be inaccurate.

JP 2002-036692 A discloses a discrimination mark instrument for applying discrimination marks to rubber members. The instrument comprises a disc shaped roller that is provided with a plurality of interchangeable character stamps and a line stamp around its circumference. The disc shaped roller is arranged for rolling over the surface of a rubber member while paint application rollers apply paint to the stamps. Hence, a combination of characters, separated by a continuous line, is repeatedly painted onto the rubber member. The characters and/or the shape of the line may be varied for each rubber member to provide a wide range of identifiable markings that uniquely identify each rubber member. The known discrimination mark instrument is arranged for applying a discrimination mark continuously along the entire length of a rubber member. It has no means for identifying the start or end of a rubber member.

It is an object of the present invention to provide an apparatus for marking batches and a system and method for marking batches and/or processing said marked batches, wherein the accuracy of the markings and/or identification of said markings can be improved.

SUMMARY OF THE INVENTION

According to a first aspect, the invention provides a system for processing marked batches in a continuously produced sheet, wherein the sheet is produced from a plurality of batches of raw elastomeric material, wherein the system comprises an apparatus for marking the sheet to identify the batches in said sheet associated with a respective one of the raw batches in a longitudinal direction of the sheet, wherein the apparatus comprises one or more marking tools for providing the sheet with a series of batch markings which are indicative of the respective sheet batch and a start or end marking indicating the start or end, respectively, of a respective sheet batch, wherein the apparatus further comprises a control unit for sending a signal indicative of a switchover to a new raw batch and an actuator for receiving said signal and for actuating the one or more marking tools to mark said sheet with a start or end marking in response to the signal.

With the combination of batch markings and a start or end marking it can be accurately ascertained which sheet batches are located where in the sheet. In particular, it will be possible to determine not only which sheet batch is located where within the sheet but also exactly where said sheet batch starts or ends. In addition, determining the switch over to a new sheet batch based on the start or end marking instead of encoder pulses can be considerably more accurate, in particular when the sheet has been stretched between the sheet production and the measurement. Also, when the start or end marking is missing, e.g. due to removal of a non-uniform part of the sheet, the absence of the start or end marking between two different batch markings can also be an accurate indicator of a sheet batch switchover. Hence, isolating one or more sheet batches within a sheet, e.g. for reworking, can be performed more easily. The one or more marking tools can be actuated to provide the sheet with the start or end marking at the moment when the start or end of a sheet batch passes underneath the one or more marking tools. Said control unit can be operationally and/or electronically connected to the sheet production unit.

In one embodiment the one or more marking tools comprises a first marking tool for providing the sheet with the series of batch markings intermittently at a regular interval along the longitudinal direction of the continuous sheet, wherein the start or end marking is the first batch marking of a new sheet batch or the last batch marking of the previous sheet batch, wherein the first marking tool is arranged for providing said start or end marking independently from the batch markings at the regular interval in response to the signal from the control unit. The start or end marking can more accurately mark the start or end of a specific sheet batch compared to the batch markings, in particular because it is applied in response to the switchover to a new raw batch rather than at a certain fixed interval. By having a single first marking tool that can provide both the batch markings and the start or end marking, the complexity of the apparatus can be reduced.

In an alternative embodiment the one or more marking tools comprises a first marking tool that is arranged for providing the sheet with a series of batch markings which are indicative of the respective sheet batch and a second marking tool that is arranged for providing a start or end marking different from the batch markings indicating the start or end, respectively, of a respective sheet batch. By providing a separate first marking tool and a second marking tool, the start or end marking can be different from the batch markings, e.g. the start or end marking may have a more distinct or easily recognizable shape.

In an embodiment thereof the first marking tool is arranged for marking the sheet intermittently at a regular interval along the longitudinal direction of the continuous sheet. The interval allows for changing the batch marking in response to a switchover to a new raw batch.

In particular, in an automatically indexing embodiment of the apparatus, the first marking tool comprises a set of index members which are arranged to be indexed in one of the intervals in response to each switchover to a new raw batch. Said indexation can occur in the brief interval between the batch markings so that a new batch marking is ready for application to the sheet when the new sheet batch has arrived at the first marking tool.

In an embodiment thereof the first marking tool is movable and/or rotatable in the longitudinal direction of the sheet, wherein the indexing members are indexable in an indexing direction transverse or perpendicular to the longitudinal direction. Hence, the first marking tool can move with the sheet in the longitudinal direction to apply the batch marking while the sheet is continuously moved in the transport direction parallel to said longitudinal direction. Simultaneously, between one of the intervals of the batch markings, one or more of the index members can be indexed in the indexing direction transverse to the longitudinal direction so that the next batch marking may be applied again in the longitudinal direction directly thereafter.

In a further embodiment thereof the first marking tool has at least two index members. This allows for a range of at least one-hundred unique batch markings.

In a further embodiment thereof each index member comprises a human-readable character and a computer-readable character for marking the sheet with a human-readable code as well as a computer-readable code.

Preferably, the human-readable characters comprises letters, decimals and/or digits. Preferably, the computer-readable characters comprises binary characters. Hence, the batch marking can be read by a human operator, e.g. for rework, as well as by a computerized system, e.g. for storing batch information and/or linking batch information to pallets and/or subsequent tire building processes.

In another preferred embodiment the index members are index discs which are indexable by rotation about a common index axis, wherein the first marking tool is operable in an indexing mode in which one of the index members is incrementally indexed with each switchover to a new raw batch, wherein the first marking tool is arranged for indexing a next one of the index members over a single increment with each full revolution of the previous index member, wherein the first marking tool is switchable from the indexing mode to a reset mode in which the index members are independently rotatable about the common index axis to a reference position. In the reset mode, the index members can be quickly and individually rotated to a reference position, without having to go through the whole incremental sequence of the first marking tool. This can be particularly time-saving for the index members that only move one increment per full revolution of the previous index member.

In a further embodiment thereof each index member comprises ten index positions or less, wherein the reference position corresponds to one of said index positions. Hence, all index members can reach their respective reference positions by rotating the index members over ten index positions or less.

Preferably, the reference position is a start position, a null position or the last position in the indexing mode. By resetting the index members to the start or null position, the sequence can be restarted. The reset to the start or null position can alternatively be used to verify the positions of the index members, and directly thereafter returning the index members to the stored last positions from the indexing mode.

In a further embodiment thereof the first marking tool comprises a drive shaft that is connected via a slip connection to each of the index members to index said index members, wherein the first marking tool further comprises a retaining element for each index member, wherein the retaining elements in the indexing mode are arranged for individually retaining and thereby preventing indexation of a respective one of the index members with respect to the drive shaft. When one of the index members is retained, its slip connection is arranged to slip over the drive shaft instead of moving with the indexing increment of the drive shaft. Hence, the position of the index member is temporarily and/or selective locked against rotation. This allows the index member to follow the indexing sequence as previously described, e.g. to rotate one increment only when the previous index member has completed a full revolution.

Preferably, each retaining element is arranged for individually retaining the respective index member in the reset mode when said respective index member is in the reference position until all index members are in their respective reference positions. Hence, each index member that has already reached the reference position can be locked against rotation with the drive shaft while the other index members are still free to rotate together with the drive shaft until they too reach their reference position. By selectively locking each index member as it reaches its reference position, it can be prevented that the drive shaft accidentally indexes said locked index member further.

More preferably, the first marking tool comprises one or more sensors for detecting the reference position of each index member, wherein the retaining elements are actuated to retain the respective index member based on the detection of the reference position by said one or more sensors. Hence, the actuating of the retaining members can be automated.

In another embodiment the first marking tool comprises a reading indicator that is arranged to provide an additional reading marking that indicates the presence of the batch marking in sheet. Preferably, the reading indicator is arranged for imprinting a reading marking in the form of a linear reading line in the sheet extending exclusively at the position of each batch marking in the longitudinal direction of the sheet. The reading indicator can activate and deactivate a sensor only when the batch marking passes underneath it to prevent false readings.

Preferably, the start or end marking is an arrow. An arrow is an easily distinguishable indicator that can also unambiguously indicate the direction in which said sheet batch starts or ends.

In a further embodiment the apparatus further comprises a first encoder that is operationally connected to the actuator to measure and send a signal indicative of the production speed, wherein the actuator is arranged to be actuated after a calculated time delay based on the production speed measured by the first encoder. Hence, with the distance between the sheet production unit, e.g. an extruder, a mixer or a mill, and the second marking tool known, the time it takes for the start or end of a sheet batch to reach the second marking tool can be calculated and the actuator can be operated to move the second marking tool onto the sheet only when the start or end of the sheet batch has reached said second marking tool.

In a preferred embodiment the first marking tool is arranged for moving along a cyclic path for applying the batch marking to the sheet, wherein during a marking part of this cyclic path, the first marking tool is arranged to move synchronously and in contact with the moving sheet. Hence, at least during the marking part of the cyclic path, the batch markings can be accurately applied to the sheet.

In an alternative embodiment the first marking tool and/or the second marking tool are wheels for applying the batch markings to the sheet while the sheet is moving. The wheels can be easily rolled over the surface while the sheet is moving. A marking can be applied with each revolution. Preferably, the wheels are embossing wheels for imprinting the markings into the sheet. The elastomeric material is still relatively soft after extrusion. Hence, the batch markings and the start or end marking can be easily imprinted in the soft elastomeric material shortly after extrusion.

In another embodiment, the apparatus further comprises one or more bases for supporting the one or more marking tools with respect to the sheet and an actuator for moving at least one of the one or more marking tools with respect to the one or more bases towards and away from the sheet to mark said sheet in response to a switchover to a new raw batch. By moving at least one of the one or more marking tools away from the sheet, the marking by said at least one marking tool can be temporarily interrupted. Similarly, said at least one marking tool can be moved towards the sheet to mark said sheet at the moment the signal is received.

In another embodiment, the system further comprises a sheet production unit for continuously producing the sheet from the plurality of raw batches, wherein the control unit is operationally and/or electronically connected to the sheet production unit.

In a further embodiment thereof the control unit is arranged for calculating a theoretical length of the sheet batches based on a comparison between the volume of a respective raw batch that goes into the sheet production unit and the volume of the respective sheet batch that comes out of said sheet production unit, wherein the control unit is arranged for sending a signal to the actuator when, within a time delay in which the actual batch switchover arrives at the first marking tool, no signal is received. Hence, a batch marking can be applied even if, for some reason, no signal is provided based on the actual batch switchover.

In a further embodiment or an independent embodiment of the system, the system comprises a stacking section, wherein the stacking section comprises a cutting device for cutting-off the sheet and a sampler unit for obtaining a sample from the sheet at the stacking section. Hence, it can be ensured that the samples taken from the sheet correspond to the sheet batches that are actually stacked onto the pallet. The closer the sample is taken to the pallet, the more accurate the sample.

Preferably, the sampler unit is provided downstream of the cutting device in the stacking direction. When taking the sample from downstream of the cutting device, one can be almost certain that the sample corresponds to a sheet batch that is actually on the pallet.

In a preferred embodiment the stacking section comprises a stacking device downstream of the cutting device in the stacking direction for stacking the sheet onto the pallet, wherein the sampler unit is located between the cutting device and the stacking device. Hence, the samples can be obtained at a location after the cutting and prior to the stacking on the pallet.

In another preferred embodiment the control unit is arranged for processing the batch markings, wherein the system further comprises a memory for storing the processed batch markings and a pallet identifying unit that is operationally connected to the control unit for either a) identifying a pallet by a previously applied pallet tag on the respective pallet and linking the information of the pallet tag to the processed batch markings in the memory;

b) adding a newly prepared pallet tag with batch information representative of the processed batch markings to a pallet; or c) adding batch information representative of the processed batch markings to a previously applied pallet tag of a respective pallet.

Hence, it becomes possible to accurately track the batches by comparing the batch markings representative for said batches in the memory with the information stored on or retrieved form the pallet tags.

According to a second aspect, the invention provides a method for marking batches in a continuously produced sheet corresponding to different batches of raw elastomeric material in a said sheet, wherein the method comprises the steps of:

continuously producing the sheet in a longitudinal direction;

providing the sheet with a series of batch markings which are indicative of the respective sheet batch; and providing a start or end marking indicating the start or end, respectively, of a respective sheet batch.

This method and its embodiments have the same technical advantages as the apparatus according to the first aspect of the invention.

In one embodiment of the method the series of batch markings are provided intermittently at a regular interval along the longitudinal direction of the continuous sheet, wherein the start or end marking is the first batch marking of a new sheet batch or the last batch marking of the previous sheet batch, wherein said start or end marking is provided independently from the regular interval at the switchover to a new sheet batch.

In an alternative embodiment of the method the series of batch markings ($M1, M2, \ldots, Mn$) are provided intermittently at a regular interval along the longitudinal direction of the continuous sheet, wherein the sheet is provided with the start or end marking different from the batch markings in response to a switchover to a new raw batch.

In an embodiment thereof the batch markings are indexed in one of the intervals in response to each switchover to a new raw batch.

In a further embodiment of the method the sheet is marked with a human-readable code as well as a computer-readable code.

Preferably, the human-readable code comprises letters and/or digits. Preferably, the computer-readable code comprises binary characters.

In another embodiment the method further comprises the step of measuring the production speed, wherein the sheet is provided with the start or end marking after a calculated time delay based on the measured production speed.

In another embodiment or an independent embodiment the method comprises the steps of stacking the sheet in a stacking section in a stacking direction onto a pallet and cutting-off the sheet with the use of a cutting device at the stacking section, wherein the method further comprises the step of obtaining a sample from the sheet downstream of the cutting device in the stacking direction. This embodiment of the method has the same technical advantage as the system according to the third aspect of the invention.

In an embodiment of the method, the stacking section comprises a stacking device downstream of the cutting device in the stacking direction for stacking the sheet onto the pallet, wherein the sample is obtained between the cutting device and the stacking device.

In an embodiment of the method, the method further comprises the step of linking the batches which are stacked onto a respective one of the pallets to information identifying said pallet, either by:

a) identifying a pallet by a previously applied pallet tag on the respective pallet and linking the information of the pallet tag to the batch markings;

b) adding a newly prepared pallet tag with batch information representative of the batch markings to the respective pallet; or c) adding batch information representative of the batch markings to a previously applied pallet tag of the respective pallet.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIG. 5 shows a top view of two consecutive sheet batches which are marked with the use of the first marking tool and the second marking tool according to FIGS. 3 and 4;

FIG. 6 shows a detail of the first marking tool used to make the markings in FIG. 5;

FIGS. 7 and 8 show two preferred embodiments of first marking tools for use in the apparatus according to FIG. 1;

DETAILED DESCRIPTION OF THE INVENTION

Figure 1:
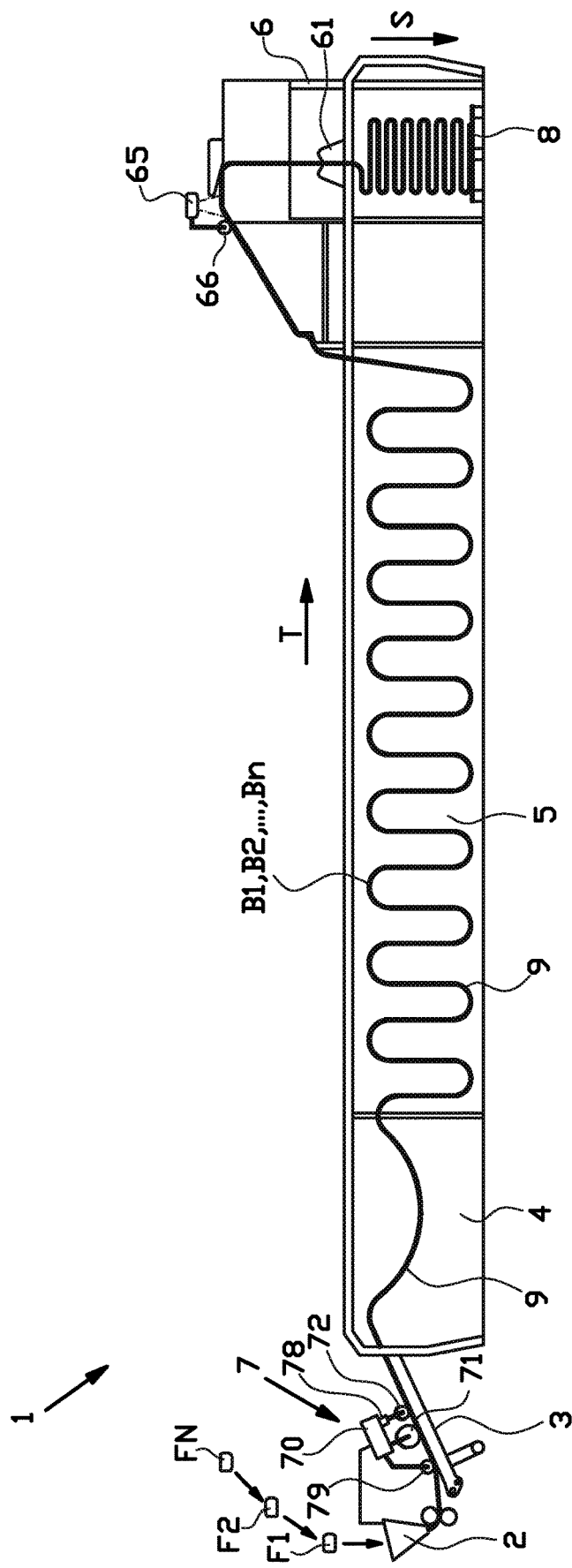
FIG. 1 shows a side view of a system according to an exemplary embodiment of the invention for processing marked batches in a continuously produced sheet, comprising a sheet production unit, an inlet, a coating section, a cooling section, a stacking section and an apparatus for marking said sheet batches.

FIG. 1 shows a system 1 for processing marked batches B1, B2, . . . , Bn (hereafter referred to as 'sheet batches') in a continuously produced sheet 9 according to an exemplary embodiment of the invention.

The system 1 comprises a sheet production unit 2 for continuously producing the aforementioned sheet 9 from a plurality of batches F1, F2, . . . , Fn of raw elastomeric material (hereafter referred to as 'raw batches'), an inlet 3 for receiving the sheet 9 in a transport direction T from the sheet production unit 2, a coating section 4 downstream of the inlet 3 in the transport direction T for coating the sheet 9 with a non-stick coating (not shown), a cooling section 5 downstream of the coating section 4 in the transport direction T for cooling the sheet 9 and a stacking section 6 downstream of the cooling section 5 in the transport direction T for stacking the sheet 9 on a pallet 8. The sheet 9 has a longitudinal direction L and normally continuous in said longitudinal direction L from the sheet production unit 2 to the stacking section 6. The coating section 4 and the cooling section 5 form a 'black box' in which the position of the raw batches F1, F2, . . . , Fn within the sheet 9 are unknown. In the 'black box', the sheet 9 may be stretched or contracted. Occasionally, an operator may remove a damaged and/or non-uniform part of the sheet 9, e.g. by cutting it out. The ends of the sheet 9 which are thereby created may be reattached manually through the adherence of the elastomeric material or may be fed through the process separately. The 'black box' may comprise different sections in addition to or replacing the coating section 4 and the cooling section 5.

Preferably, the sheet production unit 2 is one of an extruder, a mixing device or a mill for processing raw batches F1, F2, . . . , Fn of elastomeric material. Said raw batches F1, F2, . . . , Fn of elastomeric material are continuously supplied to the sheet production unit 2 to ensure a continuous production process. However, with each switchover to a new raw batch F1, F2, . . . , Fn, compounds, recipes and/or mixtures may vary slightly, resulting in a different composition of the elastomeric material along the longitudinal direction L of the continuously produced sheet 9. The system 1 further comprises an apparatus 7 for marking the sheet 9 to identify the sheet batches B1, B2, . . . , Bn associated with a respective raw batch.

Figure 3:
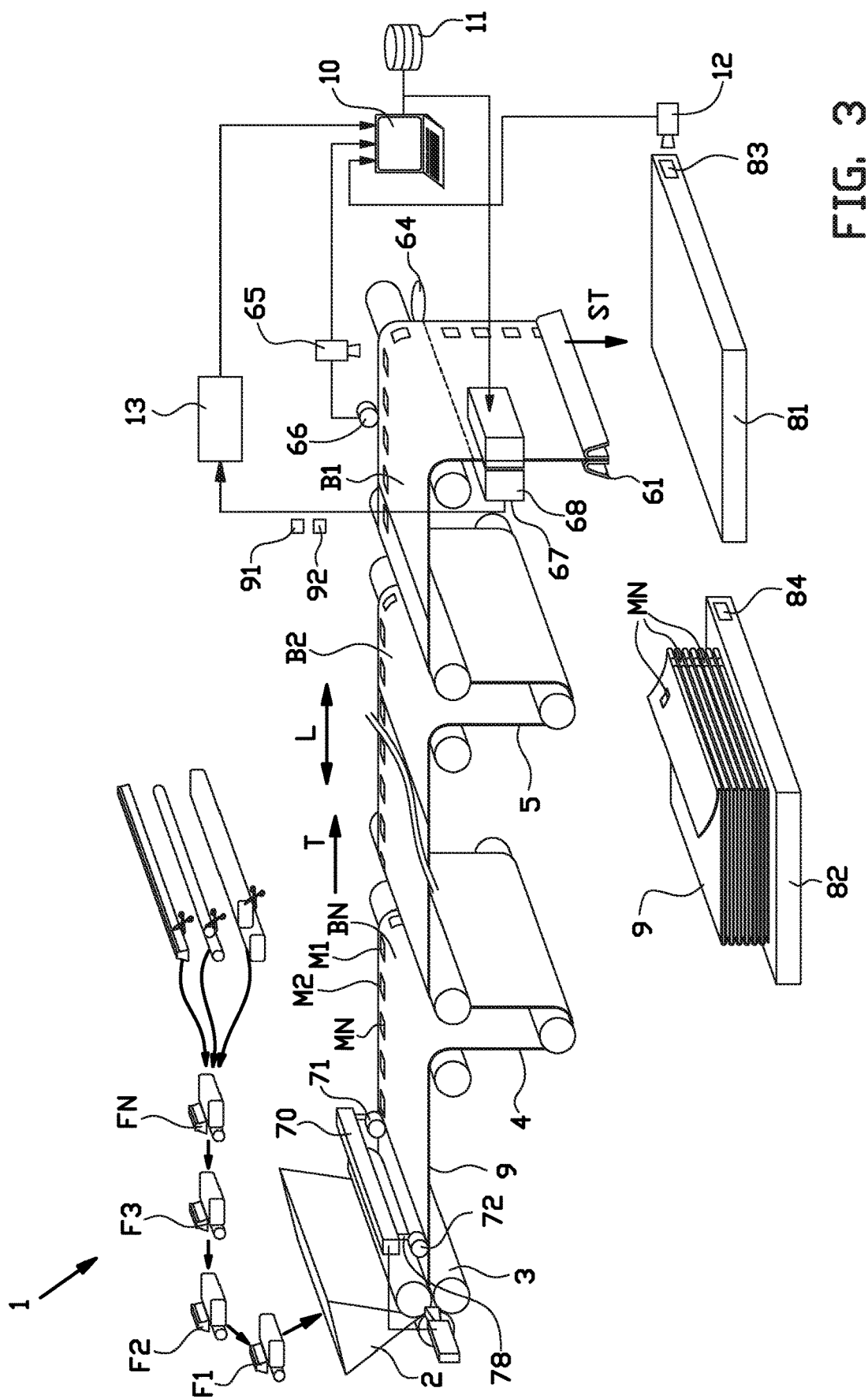
FIG. 3 schematically shows a perspective view of the system according to FIG. 1.

As shown in FIG. 3, the apparatus 7 comprises a first marking tool 71 and a second marking tool 72 for marking the sheet 9 in response to a switchover to a new raw batch F1, F2, . . . , Fn. The first marking tool 71 is arranged for providing the sheet 9 with a series of batch markings M1, M2, . . . , Mn which are indicative of the respective sheet batch B1, B2, . . . , Bn. The second marking tool 72 is arranged for providing a start or end marking A indicating the start or end, respectively, of a respective sheet batch B1, B2, . . . , Bn. In this exemplary embodiment, the first marking tool 71 and the second marking tool 72 are both wheels which can repeatedly apply one or more markings B1, B2, B2, . . . , N, A with each revolution thereof while the sheet 9 passes underneath. Alternatively, one or both marking tools may have another suitable configuration for marking, e.g. a stamp that is brought into contact with the sheet 9. Preferably, such a stamp should be able to move with the sheet 9, at least during the stamping.

In this exemplary embodiment, both marking tools 71, 72 are embossing wheels for imprinting the markings into the elastomeric material of the sheet 9. Alternatively, the markings may be applied on the surface of the sheet 9 in a suitable manner, e.g. with the use of paint or a laser.

In a first preferred embodiment, as shown in FIG. 7, the apparatus 7 comprises a first marking tool 271 and a cyclic drive 272 for driving and/or moving said first marking tool 271 along a cyclic path P for applying the batch marking M1, M2, . . . , Mn to the sheet 9. At least during a marking part of this cyclic path P, in this case during a lower stroke of the cyclic path P, the first marking tool 271 is arranged to move synchronously and in contact with the moving sheet 9. More in particular, during said lower stroke, the first marking tool 271 moves in a linear direction parallel to the longitudinal direction L of the sheet 9 and at the same speed as said sheet 9. The cyclic drive 272 may for example be a linear drive that is movable towards and away from the sheet 9 during the lower stroke and the upper stroke (the return stroke), respectively, of the cyclic path P.

In a second preferred embodiment, as shown in FIG. 8, the apparatus 7 comprises a first marking tool 371 and a cyclic drive 372 for driving and/or moving said first marking tool 371 along a cyclic path P for applying the batch marking M1, M2, . . . , Mn to the sheet 9. At least during a marking part of this cyclic path P, in this case at the lowest point of the cyclic path P, the first marking tool 371 is arranged to move synchronously and in contact with the moving sheet 9. The cyclic drive 372 may be an eccentric drive.

Figure 4:
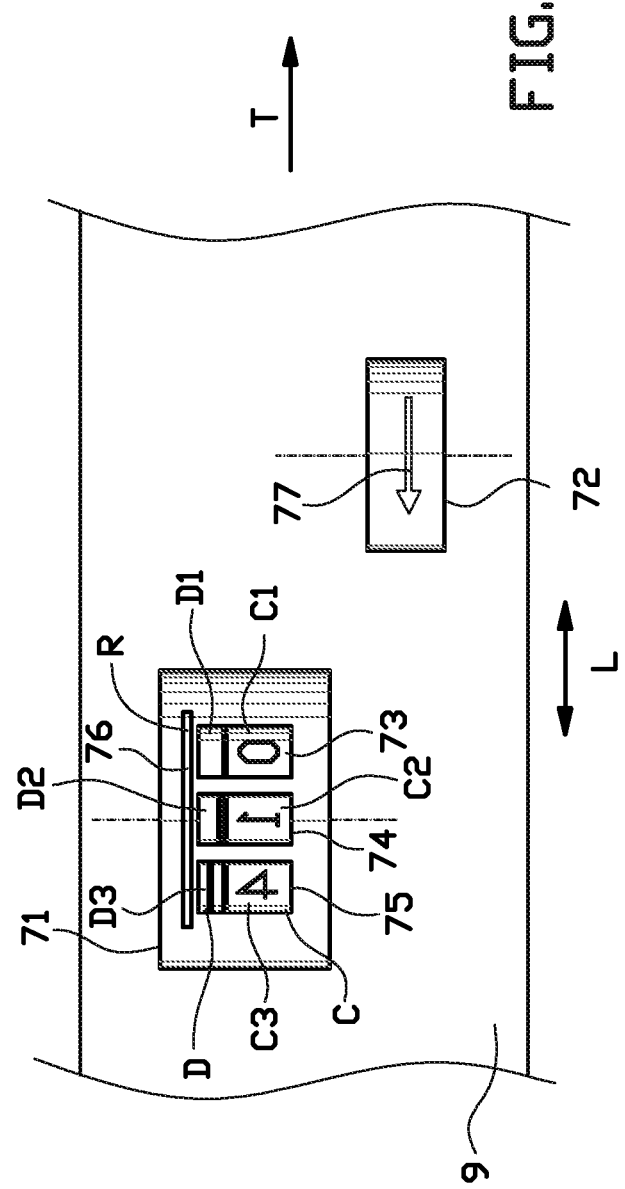
FIG. 4 shows a top view of the apparatus according to FIG. 1 with a first marking tool and a second marking tool according to FIG. 3.

As best seen in FIG. 5, the first marking tool 71 is arranged for marking the sheet 9 repeatedly and/or intermittently at a regular interval X along the longitudinal direction L of the continuous sheet 9. As shown in FIG. 4, the first marking tool 71 comprises a set of index members 73, 74, 75 that can be indexed in one of the intervals X in response to each switchover to a new raw batch F1, F2, . . . , Fn to provide a different batch marking M1, M2, . . . , Mn unique to the respective sheet batch B1, B2, . . . , Bn. In this exemplary embodiment, each index member 73, 74, 75 comprises a human-readable symbol or character C1, C2, C3 and a computer-readable symbol or character D1, D2, D3 for marking the sheet 9 with a human-readable code C as well as a computer-readable code D. Each computer-readable character D1-D3 is directly related to and/or represents a respective one of the human-readable characters C1-C3. Preferably, each set of a human-readable character C1-C3 and a computer-readable character D1-D3 is provided on the same index member 73, 74, 75 so that the human-readable code C and the computer-readable code D can be indexed simultaneously. In this exemplary embodiment, the human-readable characters C1-C3 comprise letters and/or digits and the computer-readable characters D1-D3 are binary.

Preferably, the number of index members 73, 74, 75 is at least two. In the embodiment as shown in FIG. 4, the number of index members 73, 74, 75 is three, resulting in a range of a thousand sheet batches B1, B2, . . . , Bn that can be uniquely marked. Alternative, more or less index members may be provided to suit the requirements of the apparatus 7. Preferably, at least two indexing members 73, 74 are provided.

The first marking tool 71 optionally comprises a reading indicator 76 that is arranged to provide an additional reading marking R that indicates the presence of the batch marking M1, M2, . . . , Mn in the longitudinal direction L of the sheet 9. The reading indicator 76 is preferably arranged for imprinting a reading marking R in the form of a linear reading line in the sheet 9 extending exclusively at the position of each batch marking M1, M2, . . . , Mn in the longitudinal direction L of the sheet 9.

As shown in FIG. 6, the first marking tool 71 in this example comprises a main wheel 172 that is rotatable in the longitudinal direction L of the sheet 9 to apply the batch markings M1, M2, . . . , Mn to said sheet 9 while the sheet 9 is continuously moving in the transport direction T. The first marking tool 71 further comprises indexing members 73, 74, 75 in the form of indexing wheels 173, 174, 175 that are rotatable in an indexing direction E transverse or perpendicular to the longitudinal direction L and/or the transport direction T. The first marking tool 71 is provided with small actuators, e.g. servo motors, for individually and incrementally driving the rotation of each of the indexing wheels 173, 174, 175. With each increment of the rotation, the respective indexing wheels 173, 174, 175 can be indexed.

The second marking tool 72 is arranged for marking the sheet 9 only at the start or the end of a respective sheet batch B1, B2, . . . , Bn. The second marking tool 72 comprises a suitable start or end indicator 77 for providing a start or end marking A to the sheet 9 in response to a switchover to a new raw batch F1, F2, . . . , Fn. In this embodiment of the invention, the start or end marking A is different from the batch markings M1, M2, . . . , Mn. In particular, the start or end indicator 77 is an arrow, resulting in an arrow shaped start or end marking A in the sheet 9.

As schematically shown in FIGS. 1 and 3, the marking tools 71, 72 are located between the extruder 2 and the coating section 4. Preferably, the marking tools 71, 72 are arranged to mark the sheet 9 directly after it leaves the sheet production unit 2, when the elastomeric material of the sheet 9 is still relatively soft. In this example, the apparatus 7 comprises a common base 70 for supporting both the first marking tool 71 and the second marking tool 72 with respect to the sheet 9 directly downstream of the sheet production unit 2 in the transport direction T. Alternatively, the first marking tool 71 and the second marking tool 72 may be individually supported. The apparatus 7 comprises an actuator 78 for moving the second marking tool 72 with respect to the base 70 towards and away from the sheet 9 to mark said sheet 9 in response to a switchover to a new raw batch F1, F2, . . . , Fn. The actuator 78 is operationally and/or electronically connected to a control unit at or near the sheet production unit 2 to receive a signal that is indicative of a switchover to a new raw batch F1, F2, . . . , Fn. Said signal may be manually generated by the operator or automatically generated.

The apparatus 7 further comprises a first encoder 79 between the marking tools 71, 72 and the sheet production unit 2 to measure and send a signal indicative of the production speed. The first encoder 79 is operationally and/or electronically connected to the actuator 78 so that the actuator 78 can be actuated after a calculated time delay that is a function of the distance between the sheet production unit 2 and the marking tools 71, 72 divided by the production speed measured by the first encoder 79. Similarly, the signal of the encoder can be used to timely index the index members 73, 74, 75 at the first marking tool 71. If the switchover signal, for some reason, does not occur, the production speed can also be used to calculate when the next switchover theoretically has to occur. The control unit 10 can for example calculate the theoretical length of the sheet batches B1, B2, . . . , Bn as produced by the sheet production unit 2 based on a comparison between the volume of a respective raw batch F1, F2, . . . , Fn that goes into the sheet production unit 2 and the volume (thickness, width and length) of the respective sheet batch B1, B2, . . . , Bn that comes out of said sheet production unit 2. If, within the delay in which the actual batch switchover arrives at the marking tool 71, no switchover signal is received, the system 1 can still mark the end of a sheet batch B1, B2, . . . , Bn and index the batch marking M1, M2, . . . , Mn according the calculated volume. Said batch marking M1, M2, . . . , Mn can be added to the batch administration in the memory 11 by the control unit 10. A next switchover signal will reset the volume calculation to zero again.

As shown in more detail in FIG. 1, the stacking section 6 is arranged for stacking the sheet 9 on a pallet 81, 82 in a stacking direction S. During the stacking, the sheet 9 is folded back-and-forth across the width of a pallet 8. Such as stacking section 6 is typically referred to as a 'palletizer'. In this exemplary embodiment, as shown in more detail in FIG. 2, the stacking section 6 is provided with a stacking device 61 for stacking the sheet 9 in the stacking direction S onto the pallet 8. In this example the stacking device 61 takes the form of a pendulum that is arranged for directing the sheet 9 in a rocking motion back-and-forth over the pallet 8. The stacking section 6 further comprises a cutting device 62 for cutting-off the sheet 9 when the pallet 81, 82 is filled. In this exemplary embodiment, the cutting device 62 is provided with a first cutting disc 63 and a second cutting disc 64 that cooperate for cutting-off the sheet 9.

Several sheet batches B1, B2, ..., Bn of the sheet 9 may be stacked in a continuous process on top of each in the stacking direction S on a single pallet 81, 82 before sheet 9 is cut-off and the full pallet 81, 82 is replaced for new empty pallet 8. Typically, a pallet 81, 82 may receive three to five of the sheet batches B1, B2, ..., Bn. An operator may visually identify which sheet batches B1, B2, ..., Bn are stacked on the pallet 81, 82 by reading the human-readable codes C of the batch markings M1, M2, ..., Mn. Alternatively, the computer-readable codes D may be detected by a computerized system (not shown). The operator and/or the computerized system can easily ascertain which sheet batches B1, B2, ..., Bn are on the pallet 8. The operator and/or the computerized system can also determine exactly where the switchover to a new raw batch F1, F2, ..., Fn has occurred or whether a part of the sheet 9 is missing by detecting the presence or absence of the start or end marking A.

As schematically shown in FIG. 3, the stacking section 6 comprises a sensor 65 for visually detecting and/or processing the computer-readable code D of the batch markings M1, M2, ..., Mn in FIG. 5. Optionally, the stacking section 6 may be provided with a second encoder 66 that is operationally and/or electronically connected to the sensor 65 to control said sensor 65 based on the speed of the sheet 9 passing underneath said sensor 65. Preferably, the sensor 65 is provided as close as possible to the entry of the stacking section 6 to prevent tampering with the sheet 9 between the sensor 65 and the stacking device 61 and/or the cutting device 62. Hence, the reliability of the correlation between detected markings M1, M2, ..., Mn and the actually stacked sheet batches B1, B2, ..., Bn can be improved.

Figure 2:
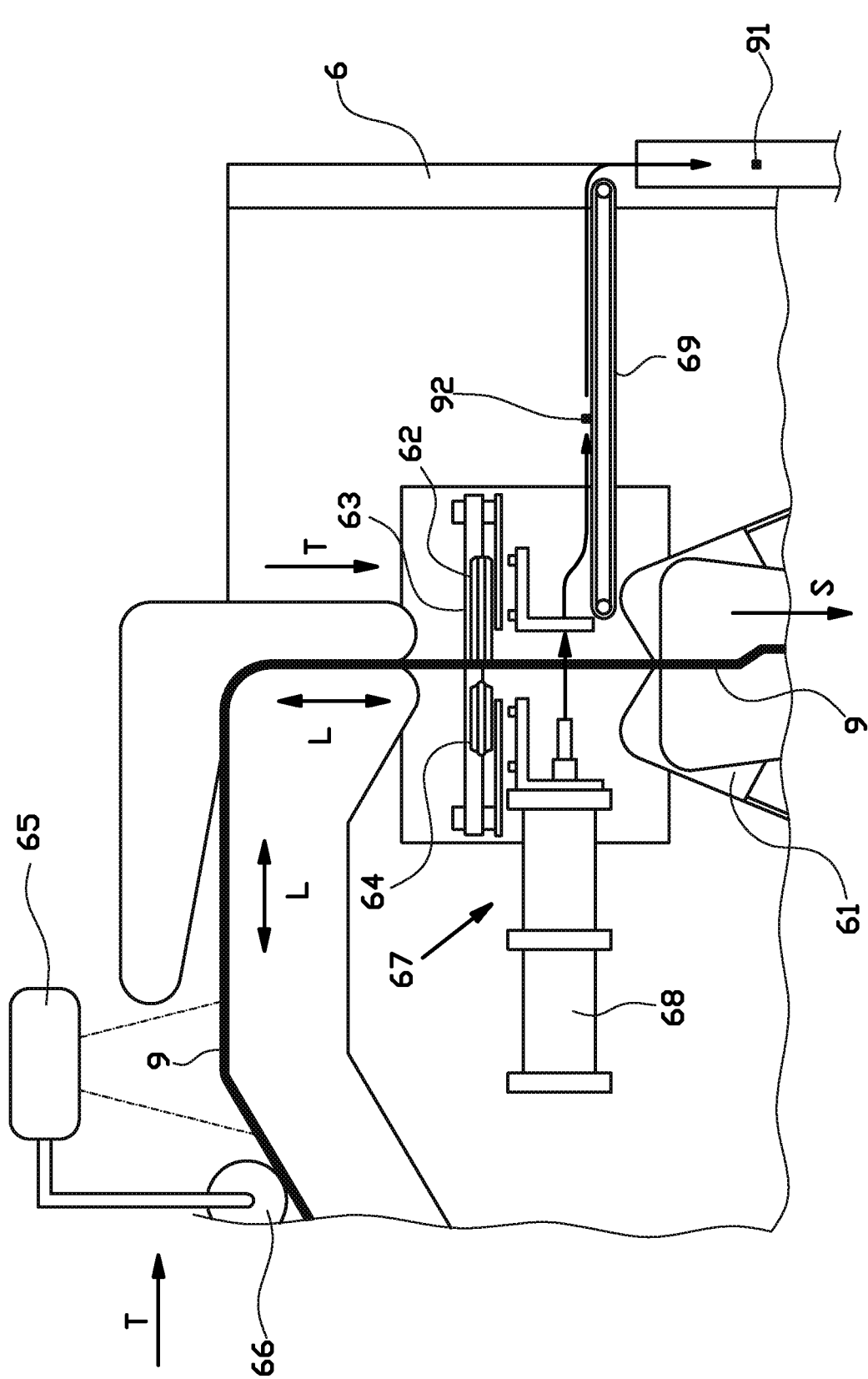
FIG. 2 shows a side view of a detail of the stacking section.

As shown in more detail in FIG. 2, the stacking section 6 further comprises a sampler unit 67 for obtaining a sample 91, 92 from the sheet 9. In particular, the sampler unit 67 comprises a punch 68 for punching out said samples 91, 92 from the sheet 9. In this exemplary embodiment, the punched-out samples 91, 92 are received onto a sample conveyor 69 to be conveyed to a lab for analysis. More in particular, the sampler unit 67 is located downstream or directly downstream of the cutting device 62 in the stacking direction S and/or the transport direction T. More in particular, the sampler unit 67 according to the present invention is provided between the cutting device 62 and the stacking device 61 in the stacking direction S and/or the transport direction T. Hence, it can be ensured that the samples 91, 92 taken from the sheet 9 correspond to the sheet batches B1, B2, ..., Bn that are actually stacked onto the pallet 8.

As shown in FIG. 3, the system 1 according to the present invention comprises a control unit 10 for processing the computer-readable codes D of the batch markings M1, M2, ..., Mn and a memory 11 for storing the processed computer readable codes D. The system 1 further comprises a pallet identifying unit 12 that is operationally connected to the control unit 10 for either a) identifying a pallet 81, 82 by a previously applied pallet tag 83, 84, e.g. a label, on the respective pallet 81, 82 and linking the information of the pallet tag 83, 84 to the processed batch markings M1, M2, ..., Mn in the memory 11;

b) adding a newly prepared pallet tag 83, 84, e.g. a label, with specific batch information to a respective pallet 81, 82; or c) adding specific batch information to a previously applied pallet tag 83, 84, e.g. a chip or an RFID tag, of a respective pallet 81, 82.

The information stored on or retrieved from the pallet tags 83, 84 can be used to link the stored computer readable codes D to said pallet tags 83, 84. Hence, it becomes possible to accurately track the batches B1, B2, ..., Bn by comparing the computer readable codes D, representative for said batches B1, B2, ..., Bn, in the memory 11 with the information stored on or retrieved form the pallet tags 83, 84.

For example, when the sensor 65 has detected, based on the batch markings M1, M2, ..., Mn, that a specific range of batches B1, B2, ..., Bn has been deposited onto a first pallet 81, a previously applied pallet tag 83 of said first pallet 81 is scanned and the identity information of said first pallet 81 is linked in the control unit 10 to the batch markings M1, M2, ..., Mn corresponding to the specific range of batches B1, B2, ..., B and stored together with said batch markings M1, M2, ..., Mn in the memory 11.

Alternatively, a new pallet tag 83 may be printed and applied to the first pallet 81. In yet another alternative embodiment, the computer readable codes D that are stored in the memory 11 may be transferred by the pallet identifying unit 12 onto an electronic pallet tag 83, 84, e.g. a chip or an RFID tag. Hence, in the latter two alternative embodiments, the information needed to identify which batches B1, B2, ..., Bn is stored at the pallet 81, 82 in addition to or instead of in the memory 11.

As further shown in FIG. 3, the system 1 comprises a lab 13 for examining and/or analyzing the samples 91, 92 taken from the sheet 9 at the stacking section 6. Preferably, the analysis from the lab 13 is fed back to the control unit 10 to be stored together with the batch information and/or the pallet information in the memory 11. Said information can be used in a later stage of the tire building or at any stage during the tire life, for tracking down the batches B1, B2, ..., Bn that were used in the production of a specific tire.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

Figure 9:
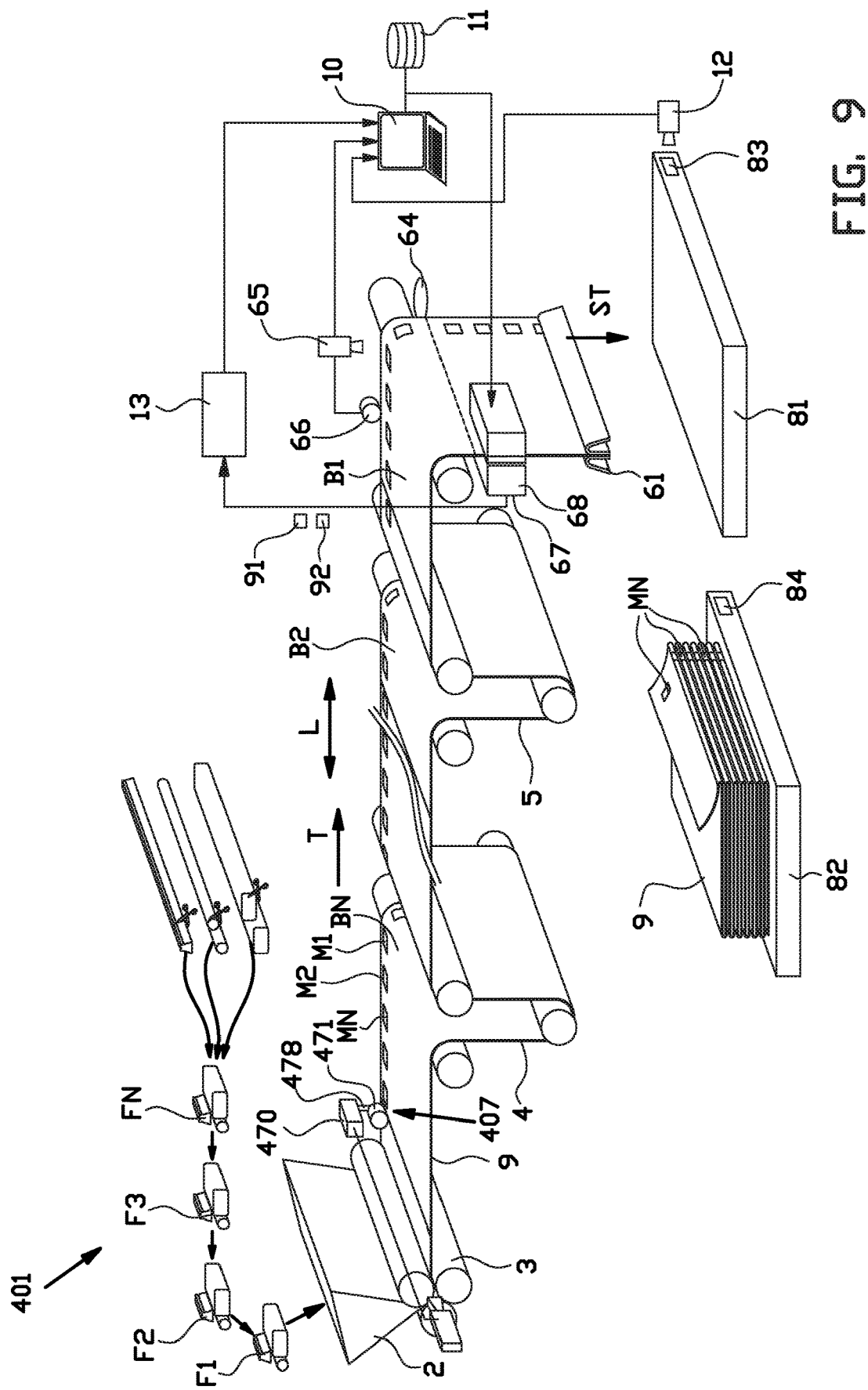
FIG. 9 shows schematically shows a perspective view of an alternative system according to a further embodiment of the invention.
Figure 10:
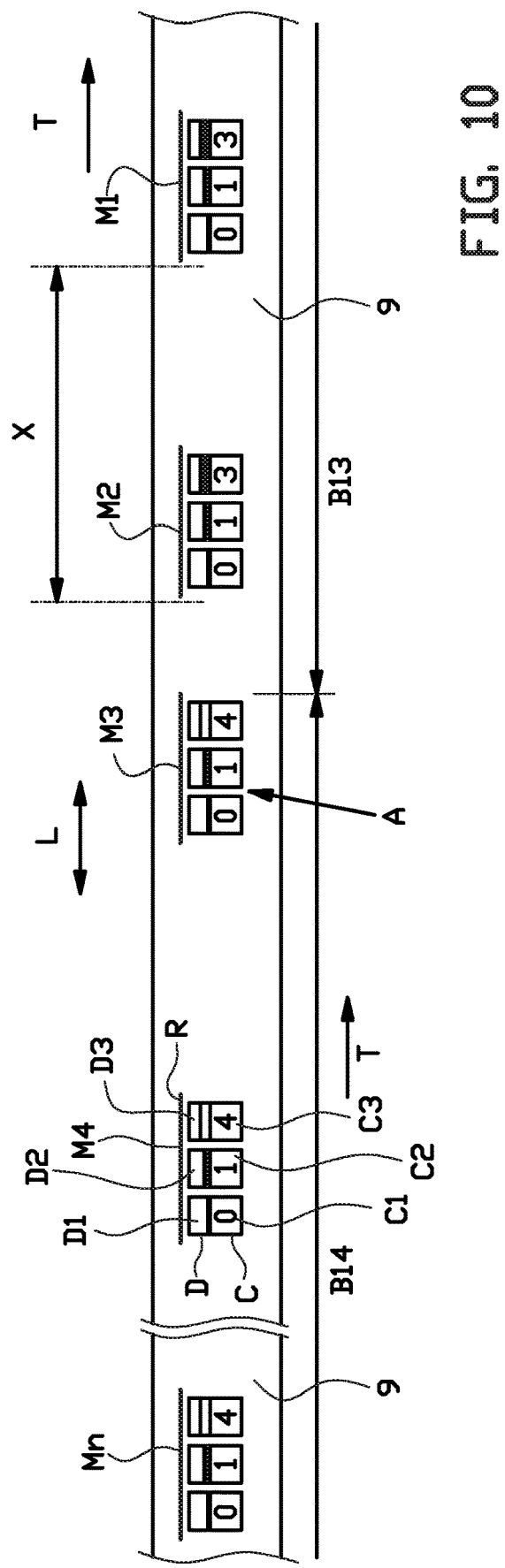
FIG. 10 shows a top view of two consecutive sheet batches which are marked with the use of the alternative system according to FIG. 9.

For example, FIG. 9 shows an alternative system 401 according to a further embodiment of the invention, which differs from the previously discussed system 1 in that it is provided with a first marking tool 471 only. The first marking tool 471 is arranged for providing with the series of batch markings M1, M2, ..., Mn as well as the start or end marking A, as shown in FIG. 10.

In other words, the first marking tool 471 is a single marking tool with two modes of operation. In the first mode, the first marking tool 471 is arranged for providing the sheet 9 with the series of batch markings M1, M2, . . . , Mn intermittently at a regular interval X along the longitudinal direction L of the continuous sheet 9. In the second mode, the same first marking tool 471 is also arranged for providing the sheet 9 with the start or end marking A. To this end, the alternative system 401 may again be provided with a base 470 for supporting the single marking tool 471 relative to the sheet 9 and an actuator 478 to move the single first marking tool 471 towards and away from the sheet 9.

Preferably, the start or end marking A is similar to one of the batch markings M1, M2, . . . , Mn. The difference is that the start or end marking A is applied in response to the signal from the control unit, independently from the regular interval X. In this particular example, as shown in FIG. 10, the start or end marking A is equivalent to the first batch marking M3 of the new sheet batch B14. Alternatively, the start or end marking A may be equivalent to the last batch marking M2 of the previous sheet batch B13. If the start or end marking A partially overlaps or coincides with one of the batch marking M1, M2, . . . , Mn, said one batch marking M1, M2, . . . , Mn is skipped and replaced by the start or end marking A. The operator will recognize that the start of a new sheet batch B1, B2, . . . , Bn is represented by the start or end marking A in the form of the newly indexed batch marking M3 of the new batch B14 or—alternatively—the last batch marking M2 of the previous batch B13.

Figure 11:
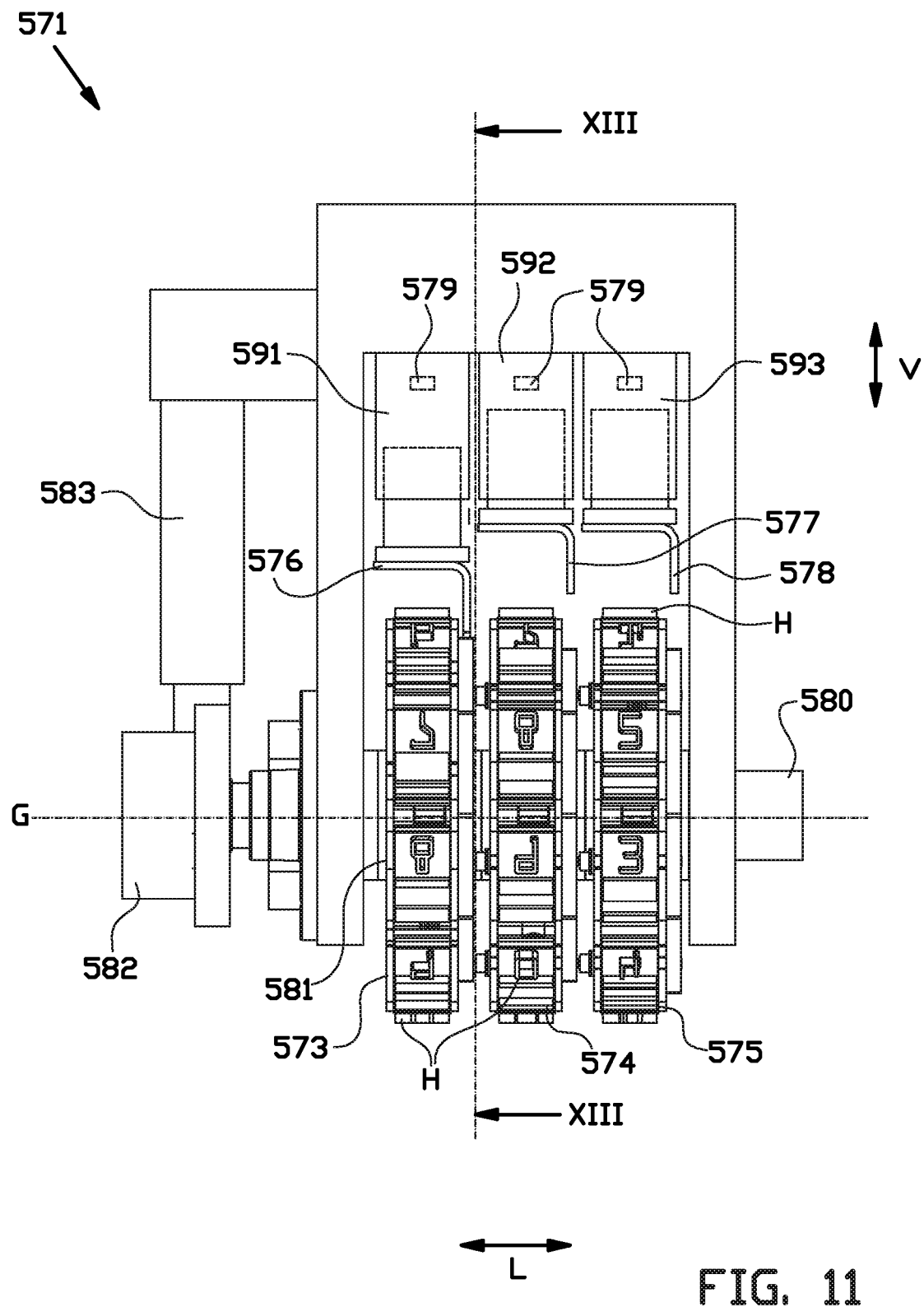
FIG. 11 shows a front view of an alternative first marking tool for use in the apparatus according to FIG. 1 or 9.
Figure 12:
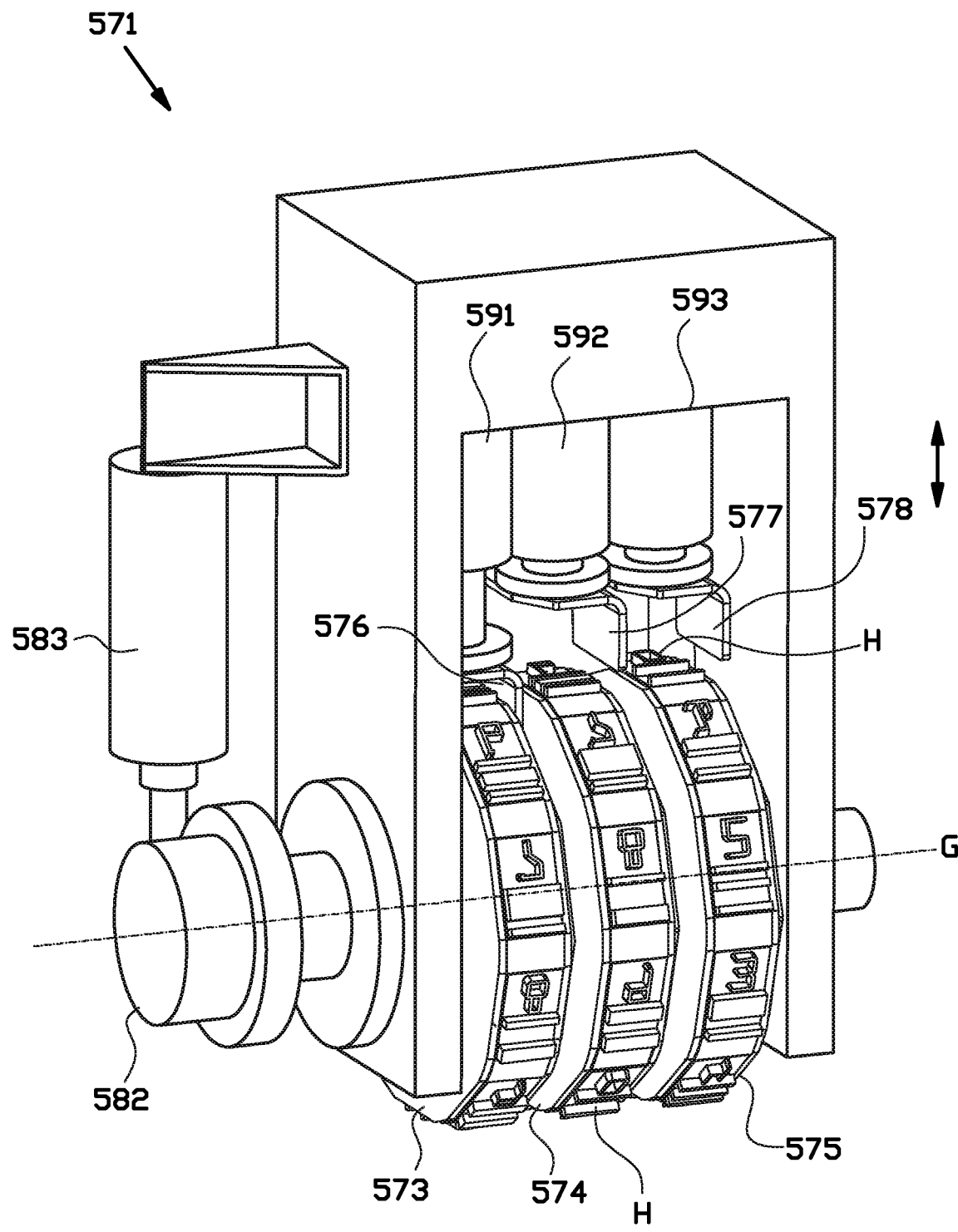
FIG. 12 shows a perspective view of the alternative marking tool of FIG. 11.
Figure 13:
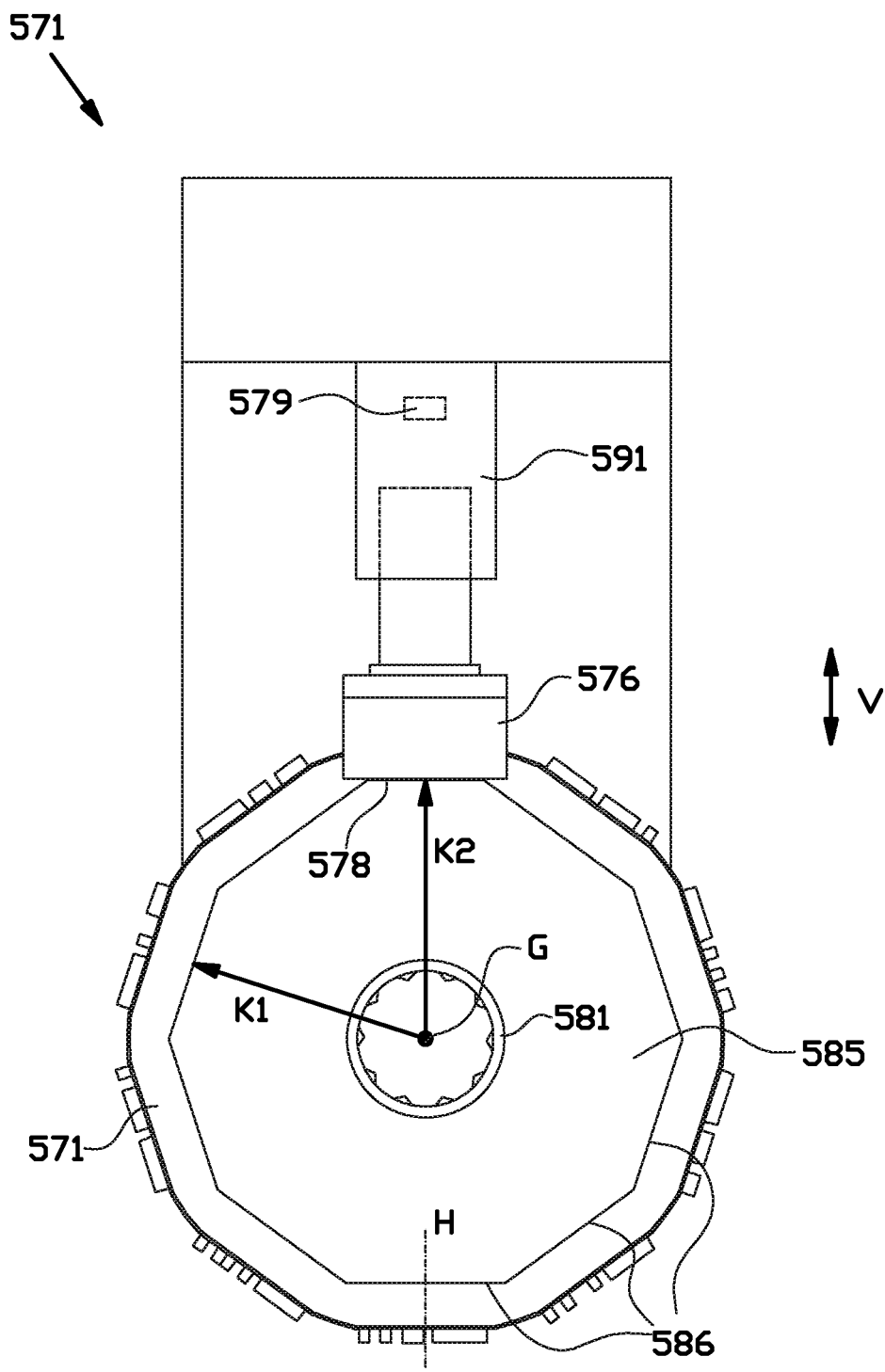
FIG. 13 shows a cross section of the alternative first marking tool according to line XIII-XIII in FIG. 11.

FIGS. 11-13 show an alternative first marking tool 571 for use with the system 1, 401 of FIG. 1 or 9. The alternative first marking tool 571 comprises a drive shaft 580 that defines a common index axis G and a plurality of index members 573, 574, 575 in the form of index discs which are indexable by rotation about said common index axis G. The first marking tool 571 further comprises an index drive 583 that is operationally connected to the drive shaft 580 to drive the drive shaft 580 in an indexing direction about the common index axis G over an angle corresponding to one index increment of the index members 573, 574, 575. In this particular example, the index drive 583 is connected to the drive shaft 580 via a ratchet connection 582 that transmits the driving force of the index drive 583 in the indexing direction only. As shown in FIG. 13, the index members 573, 574, 575 are connected to the drive shaft 580 via slip joint connections 581. Said slip joint connections 581 may for example be formed by longitudinal slots (not shown) in the drive shaft 580 and engagement elements (not shown) biased with respect to said index members 573, 574, 575 to engage the longitudinal slots. The engagement elements are designed to slip in and out of said longitudinal slots when the index members 573, 574, 575 are held against rotation with sufficient force, so that the drive shaft 580 only indexes those index members 573, 574, 575 which are free to rotate together with said drive shaft 580.

To selectively prevent rotation of one or more of said index members 573, 574, 575, the alternative first marking tool 571 is provided with a retaining element 576, 577, 578 for each index member 573, 574, 575. Said retaining elements 576, 577, 578 are arranged for individually retaining a respective one of the index members 573, 574, 575. In particular, it can be observed in FIG. 13 that each index member 573, 574, 575 is provided with a retaining disc 585 that has a plurality of faces 586, 587 distributed around its circumference and corresponding to the respective index positions of the respective index member 573, 574, 575. Each retaining element 576, 577, 578 comprises an abutment member, in this example in the form of a bracket, that is arranged to abut one of the faces 586, 587 in an abutment direction V and thereby preventing further rotation of the respective index member 573, 574, 575 about the common index axis G. The alternative first marking tool 571 further comprises retaining drives 591, 592, 593 for moving the respective retaining elements 576, 577, 578 into and out of abutment with the respective faces 586, 587 in the abutment direction V.

Note that the faces 586 extends at a first radius K1 from the common index axis G, except for one face 587 that extends at a second radius K2 different from the first radius K1. This one face 587 is indicative of or corresponds to a start or null position H of the respective index member 573. In this particular example, the start or null position H of the index member 573 is the position in which the position corresponding to the value null is at the bottom of the index member 573, as reflected by the letter H in FIG. 13.

The alternative first marking tool 571 as described above is operable in an indexing mode in which the first index member 573 is incrementally indexed with each switchover to a new raw batch (F1, F2, . . . , Fn). The second index member 574 is only indexed over a single increment with each full revolution of the first index member 573. The third index member 575 is only indexed over a single increment with each full revolution of the second member 574. The retaining elements 576, 577, 578 are operated accordingly to retain the second index member 574 and the third index member 575 as their adjacent index member 573, 574 rotates. Hence, with ten index positions per revolution per index member 573, 574, 575, it takes 999 increments to go through a full sequence of the first marking tool 571.

When resetting or temporarily interrupting the marking process, time can be saved by releasing the index members 573, 574, 575 with respect to the retaining members 576, 577, 578 and independently rotating the index members 573, 574, 575 to a respective reference position. Said reference position H can be a start position, a reference position or a last position of the respective index member 573, 574, 575 in the marking process. For this purpose, the alternative first marking tool 571 is switchable from the indexing mode, as described above, to a reset mode in which the index members 573, 574, 575 are individually retained by their respective retaining elements 576, 577, 578 as soon as the respective index member 573, 574, 575 is in the reference position H. This process is continued until all index members 573, 574, 575 are in their respective reference positions H.

Preferably, as shown in FIGS. 11 and 13, the alternative first marking tool 571 comprises one or more sensors 579 for detecting the reference position H of each index member 573, 574, 575. Hence, the retaining elements 576, 577, 578 can be actuated to retain the respective index member 573, 574, 575 based on the detection of the reference position H by said one or more sensors 579. In this particular embodiment, each retaining elements 576, 577, 578 is moved into abutment with the faces 586, 587 of the retaining disc 585 of the respective index member 573, 574, 575 by the respective actuator 591, wherein the one or more sensors 579 are arranged for detecting the stroke of the respective retaining drive 591. As the one face 587 that corresponds to the reference position H is at a different radius K2 to the radius K1 of the other faces 586, the stroke of the retaining drive 591 will be different when the respective retaining element 576, 577, 578 is in abutment with said one face 587.

The invention claimed is:

1. A method for marking batches in a continuously produced sheet corresponding to different batches of raw elastomeric material in a sheet, wherein the method comprises steps of:

continuously producing a sheet in a longitudinal direction;

providing the sheet with a series of different batch markings, wherein each different batch marking is unique to a respective sheet batch, wherein a series of batch markings are provided intermittently at a regular interval along the longitudinal direction of the continuous sheet; and providing a start or end marking indicating the start or end, respectively, of a respective sheet batch in response to a switchover to a new batch of raw elastomeric material.

2. The method according to claim 1, wherein the start or end marking is a first batch marking of a new sheet batch or a last batch marking of the previous sheet batch, wherein said start or end marking is provided independently from the regular interval at the switchover to a new sheet batch.

3. The method according to claim 1, wherein the series of batch markings are provided intermittently at a regular interval along the longitudinal direction of the continuous sheet, wherein the sheet is provided with the start or end marking different from the batch markings in response to a switchover to a new raw batch.

4. The method according to claim 2, wherein the batch markings are indexed in one of the intervals in response to each switchover to a new raw batch.

5. The method according to claim 1, wherein the sheet is marked with a human-readable code as well as a computer-readable code.

6. The method according to claim 5, wherein the human-readable code comprises letters or digits.

7. The method according to claim 5, wherein the computer-readable code comprises binary characters.

8. The method according to claim 1, wherein the method further comprises the step of measuring a production speed of continuously producing the sheet in a longitudinal direction, wherein the sheet is provided with the start or end marking after a calculated time delay based on the production speed as measured.

9. The method according claim 1, wherein the method comprises the steps of stacking the sheet in a stacking section in a stacking direction onto a pallet and cutting-off the sheet with the use of a cutting device at the stacking section, wherein the method further comprises the step of obtaining a sample from the sheet at the stacking section.

10. The method according to claim 9, wherein the sample is obtained downstream of the cutting device in the stacking direction.

11. The method according to claim 9, wherein the stacking section comprises a stacking device downstream of the cutting device in the stacking direction for stacking the sheet onto the pallet, wherein the sample is obtained between the cutting device and the stacking device.

12. The method according to claim 9, wherein the method further comprises the step of linking the batches which are stacked onto a respective one of the pallets to information identifying said pallet, either by:
   a) identifying a pallet by a previously applied pallet tag on the respective pallet and linking the information of the pallet tag to the batch markings;
   b) adding a newly prepared pallet tag with batch information representative of the batch markings to the respective pallet; or
   c) adding batch information representative of the batch markings to a previously applied pallet tag of the respective pallet.

13. The method according to claim 3, wherein the batch markings are indexed in one of the intervals in response to each switchover to a new raw batch.

\* \* \* \* \*